UNITED STATES PATENT OFFICE.

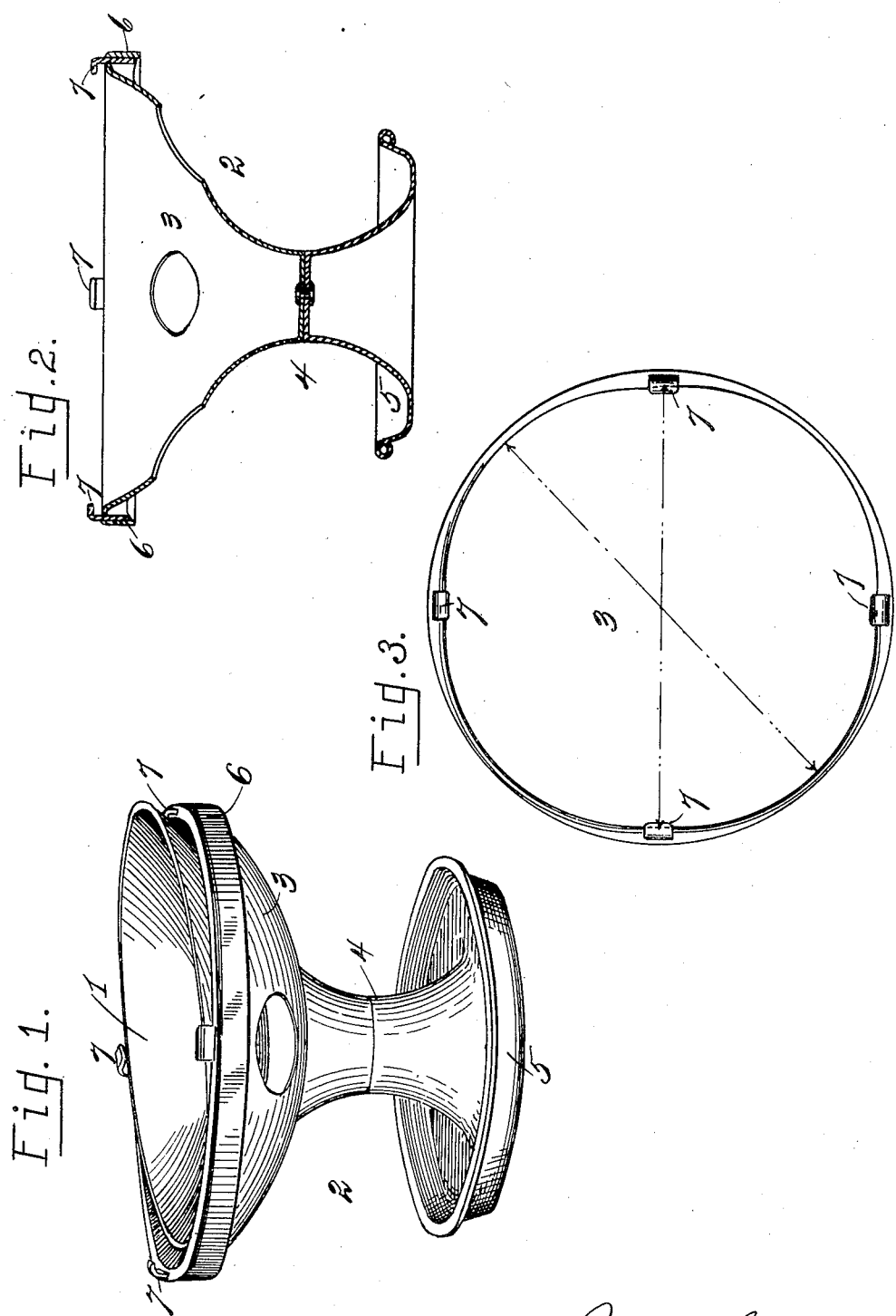

RILEY SWEERS, OF TOLEDO, OHIO.

DISH AND HOLDER FOR ICE-CREAM.

1,105,715.     Specification of Letters Patent.     Patented Aug. 4, 1914.

Application filed February 6, 1914. Serial No. 816,869.

*To all whom it may concern:*

Be it known that I, RILEY SWEERS, a citizen of the United States, residing at 131 Prescott street, Toledo, in the county of Lucas and State of Ohio, have invented certain new and useful Improvements in Dishes and Holders for Ice-Cream; and I do declare the following to be a full, clear, and exact description of the invention, such as will enable others skilled in the art to which it appertains to make and use the same, reference being had to the accompanying drawings and to the letters and figures of reference marked thereon, which form a part of this specification.

In "ice cream parlors" and other places where ice cream and the like are dispensed and where at times it is necessary to serve many customers in a short time, the difficulty of thoroughly cleansing the ice cream dishes in rush hours as fast as the dishes are used, is manifest. Even under the most favorable circumstances, where hot water and soap and other conveniences are available, the absolute cleanliness of the dishes is generally not free from doubt.

One of the objects of my invention is to obviate the objection here indicated by furnishing a dish which shall be entirely clean and sterile and which, while being ornamental and attractive in appearance, is so cheap that it may be thrown away or destroyed after being once used, and this with little if any greater expense than attends the washing of the ordinary dish.

A further object of my invention is to provide a holder for the dishes above referred to, with which the dish may be instantly and firmly engaged, to give it the necessary stability, and from which the dish may be readily and quickly detached.

To these ends, my invention consists of the devices hereinafter described and shown, and illustrated in the accompanying drawing, in which—

Figure 1. is a perspective view of my dish-holder with a dish partly inserted therein or partly removed therefrom; Fig. 2, a central vertical sectional elevation of the holder with the dish removed, and Fig. 3, a top-plan-view of the holder.

Like numerals represent like parts throughout the drawings.

In the drawings, 1 is a thin flexible resilient wood dish, of about the thickness of thin veneer, cut or scooped by means of a curved knife in concavo-convex form and having substantially a circular level margin. It is not essential, however, that the dish-margin be a true circle since the dish is quite flexible and in the course of manufacture and through warping and shrinkage will vary from the circular form but will, within certain limits, quite readily conform to its holder, now to be described.

2 is the holder, preferably of metal, cast, stamped, spun or otherwise formed as may be desired.

In the form of the holder shown,—by way of example,—in the drawings, the holder consists of an upper bowl-like part 3 supported by a standard 4 and having a broadened disk-like supporting base 5. The bowl-like portion may be, and preferably is, composed of open or filigree work. The upper margin of the bowl-like part is turned outwardly and downwardly to form a flange 6. Projecting upwardly from the edge of the bowl-like part of the holder is a series of hooks or fingers 7, the extremities of which are turned inwardly to form hook-like portions, as clearly illustrated in Fig. 2. The dish is slipped edgewise under and in engagement with the hooks at one side of the holder and is pressed into place, so that the edge of the dish,—being flexible,—may be forced laterally into place as will be understood from Fig. 1. To remove the dish it is only necessary to reverse the operation and to then slip the dish edgewise away from the holder. Since as above stated, these dishes are not uniformly and exactly circular upon their upper margins, it becomes necessary to make some provision in the holder for the accommodation of a diversity of shapes. While the outer circumference of the upper part of the holder is circular in outline, it will be observed by inspection of Fig. 3 and the dotted dimensional lines therein, that the inner line of the upper rim of the holder approaches somewhat a quadrilateral form. It will also be seen that if the dish be not perfectly round, it will, when forced into place, as above described, have room to bulge slightly to one side or the other of either one of the retaining hooks, and will thus be forced into substantially circular form.

Thus far the only sort of dish to which I have referred is a wood dish. As this dish is cut from a hot steamed block of wood, it is clean and sterile and is by far preferably to any other kind of dish such as is designed to be used but once. It is clear, however, that while not so desirable, other thin flexible temporary dishes, such for instance as paper dishes, may be employed without departing from the spirit of my invention.

Having described my invention, what I claim and desire to secure by Letters Patent, is—

1. In a device of the described character, a dish-holder adapted for the reception of a substantially circular resilient dish and having a rim and upon its rim dish-engaging devices, the inner circumference of said rim being bowed outwardly at a plurality of points.

2. In a device of the described character, a holder comprising an extended base and a bowl-like portion having upon its rim a series of inwardly projecting fingers, said rim having outwardly bowed portions between the fingers.

3. In a device of the described character, a thin flexible resilient concavo-convex dish having a substantially level curvilinear upper edge, combined with a holder having a plurality of engaging means with which said dish may be sprung into operative engagement, the rim of said holder having outwardly bowed portions between said engaging means.

In testimony whereof I affix my signature in presence of two witnesses.

RILEY SWEERS.

Witnesses:
E. T. OSBORN,
L. WELLER.